United States Patent
Lovkvist et al.

(10) Patent No.: US 6,212,055 B1
(45) Date of Patent: Apr. 3, 2001

(54) SELF-HEALING CAPACITOR

(75) Inventors: Thomas Lovkvist; Henri Bonhomme, both of Charleroi; Cipriano Monni, Carnieres, all of (BE)

(73) Assignee: Asea Brown Boveri Jumet S.A. (ABB), Charleroi (BE)

( * ) Notice: Subject to any disclaimer, the term of this patent is extended or adjusted under 35 U.S.C. 154(b) by 0 days.

(21) Appl. No.: 09/269,728

(22) PCT Filed: Oct. 2, 1997

(86) PCT No.: PCT/BE97/00113

§ 371 Date: Apr. 2, 1999

§ 102(e) Date: Apr. 2, 1999

(87) PCT Pub. No.: WO98/14967

PCT Pub. Date: Apr. 9, 1998

(30) Foreign Application Priority Data

Oct. 2, 1996 (BE) .................................... PCT/BE96/00104

(51) Int. Cl.[7] ............................. H01G 4/015; H01G 2/00
(52) U.S. Cl. ..................... 361/273; 361/275.1; 361/301.4
(58) Field of Search ................................ 361/271, 272, 361/274.1, 274.2, 274.3, 275.1, 275.2, 275.3, 275.4, 298.4, 301.1, 301.2, 301.3, 301.5, 304, 306.1, 307, 308, 309, 310, 273

(56) References Cited

U.S. PATENT DOCUMENTS

| | | | |
|---|---|---|---|
| 3,475,659 | * | 10/1969 | Buice et al. ............................ 361/328 |
| 4,635,163 | * | 1/1987 | Voglaire .............................. 361/275.4 |
| 4,639,828 | * | 1/1987 | Strange et al. ........................ 361/272 |
| 4,791,529 | * | 12/1988 | Duncan et al. ..................... 361/274.1 |
| 4,837,660 | * | 6/1989 | Theoleyre et al. ................. 361/275.2 |
| 4,974,116 | * | 11/1990 | Utner et al. ........................ 361/275.2 |
| 5,381,301 | * | 1/1995 | Hudis ................................ 361/275.2 |
| 5,680,290 | * | 10/1997 | Akai et al. .......................... 361/275.4 |

FOREIGN PATENT DOCUMENTS

| | | |
|---|---|---|
| 1 044 947 | 11/1958 | (DE) . |
| 1 764 858 | 8/1971 | (DE) . |
| 26 01 426 | 5/1977 | (DE) . |
| 26 06 175 | 8/1977 | (DE) . |
| 26 06 176 | 8/1977 | (DE) . |
| 0 244 281 | 11/1987 | (EP) . |
| 0 356 348 A1 | 2/1990 | (EP) . |
| 2 204 996 | 11/1988 | (GB) . |

* cited by examiner

*Primary Examiner*—Kristine Kincaid
*Assistant Examiner*—Eric Thomas
(74) *Attorney, Agent, or Firm*—Jacobson, Price, Holman & Stern, PLLC

(57) ABSTRACT

A self-healing power capacitor has (a) at least one capacitor unit, each capacitor unit has at least one winding, the windings of each capacitor unit are provided with a first and a second connection electrode and surrounded by an encapsulation material and housed in a first casing (b) at least one protection element for each capacitor winding, the protection element has a membrane provided for activating, upon a pressure exerted on the membrane by a gas produced by a short-circuit within the windings, a current interruption element, the protection element is mounted in a second casing, which is mounted inside the first casing, the second casing has one side formed by the membrane and is separated by a narrow gap from an end-face of the windings.

8 Claims, 2 Drawing Sheets

SELF-HEALING CAPACITOR

The present invention relates to a self-healing power capacitor comprising at least one capacitor unit, each capacitor unit comprising at least one winding, made of at least two films of insulating material on which a metal coating has been applied, said windings of each capacitor unit being provided with a first and a second connection electrode, said windings being surrounded by an encapsulation material and housed in a first casing, said capacitor having at least one protection element for each capacitor winding, said protection element being mounted in a second casing of which one side is formed by a membrane, said protection element being provided for activating, upon a pressure exerted on said membrane by a gas produced by a short-circuit within said windings, a current interruption element connected in series with one of said electrodes, said protection element being separated from an end-face of said windings.

Such a self-healing power capacitor is known from GB-A-2 204 996. The power capacitor is i.a. used in electrical networks to compensate reactive power (correct cos φ) or as parts of filters to absorb harmonic currents and thereby lower harmonic voltage distortion on the networks. The known power capacitors are manufactured by first evaporating a metallic material on a film and then wind the metallized film. A first and a second electrode are applied on the extremities of the metallized film, in order to provide electrical connectors. The windings are surrounded by an encapsulation or filling material, such as for example resin, oil or a gel. The windings and their encapsulation material are housed in the first casing.

When the metallized film of a self-healing capacitor breaks down, the short-circuit is removed automatically by the following process. As a short-circuit is established, the current through the failed spot will increase rapidly. This high current will create a very high current density in the thin evaporated electrode around the failed spot. The current will rapidly become so high that the evaporated electrode will transform into a gaseous plasma and blow away from the film around the failed spot. Without the electrode around the failed spot, insulation will be re-established. The capacitor has self-healed and may continue to operate normally. The process of self-healing is very short (microseconds) and the area of insulation created around the failed spot is very small (a few square millimeters). Since the area of one capacitor winding is typically ten's of square meters, the relative loss in capacitance resulting from one self-healing operation is very small. Many thousands of self-healing operations may occur without any noticeable effect on the capacitor or its performance. As the dielectric system ages a situation will develop where the thermal and dielectric load of the system become too high for the mechanism to function. At this point in time an avalanche of self-healings will occur and create a short-circuit of the capacitor element. Self-healing capacitors however do not always create short-circuits with a low voltage drop, i.e. a low short-circuit impedance. The short-circuit impedance may vary between low values and quite high values.

In order to protect self-healing power capacitors against such short-circuits, protection elements are built-in in the casing of the power capacitor. With the known capacitor, the protection element is formed by an overpressure disconnector. The principle of such an overpressure disconnector is that gases, produced by a short-circuit within the windings of the capacitor, will accumulate in the space between the windings and the second casing and cause an overpressure to build up. This overpressure bulges the membrane of the protection element, which is applied above the windings.

In the known capacitor the membrane comprises a wire which is connected in series with one of the electrodes. The overpressure created by the gas causes the membrane to bulge. This bulging causes the wire to break and thus the current flow in the winding to be interrupted.

A drawback of the known self-healing power capacitor is that the second casing, housing the protection element, is fixed to the upper end wall of the first casing. This signifies that the protection element is not physically separated from the end walls of the first casing. Deformation or damages to the first casing could thus also cause damages to the protection element. Moreover an erroneous mounting of the second casing on the upper end wall of the first casing could lead to a malfunctioning of the protection element. Also a leakage in the upper wall of the first casing could lead to a malfunctioning of the protection element.

It is an object of the present invention to realise a self-healing power capacitor wherein the protection element is mounted in a less vulnerable manner.

For this purpose a self-healing power capacitor is characterised in that said second casing is lodged inside said first casing, separated from the top and/or bottom walls belonging to said first casing, said second casing being lodged in said encapsulation material and having at least one wall separated by a narrow gap from said windings. Since the second casing is lodged separated from the side walls of the first casing, the protection element and the windings form separate elements which are together mounted in the first casing, which no longer needs to be provided with an upper end wall. The encapsulation of the protection element and the one of the windings enable to mount them in the first casing in a reliable and easy manner. As the protection element is independent of the side walls, it is less vulnerable for damages caused to the first casing. As windings and protection element are both encapsulated but separated from each other by the narrow gap, the gas can only accumulate in the narrow gap. The dimension of the gap and the fact that the protection element is lodged in the encapsulation material, will cause the gas to remain in the gap and thus exert enough pressure on the membrane, and thus providing a reliable operation of the protection element.

A first preferred embodiment of a self-healing power capacitor according to the invention is characterised in that said current interruption element comprises a fuse and said protection element comprises a switch, provided to be switched by said membrane, said switch being connected in parallel with said first and second electrode. In this embodiment the membrane acts as a switch, which short-circuits the first and the second electrode. As the fuse is connected in series with one of the electrodes, a short-circuit of the electrodes will melt the fuse and so doing, disconnect the capacitor unit.

A second preferred embodiment of a self-healing power capacitor according to the invention is characterised in that said current interruption element comprises a fuse wire connected in series with one of said electrodes and placed in front of a cutting member, which is part of said protection element, said cutting member being provided to be moved by said membrane towards said wire in order to cut said wire, when said pressure is exerted on said membrane. With this embodiment, the movement of the membrane, caused by a gas pressure applied thereon, will cause the cutting element to be moved towards the fuse wire. Once the cutting element reaches the wire, it will cut the latter, thereby disconnecting the capacitor unit. The travel distance of the cutting element is calibrated in such a manner as to enable a reliable protection element.

Preferably said membrane is a bi-stable membrane. A bi-stable membrane has the advantage that it provides either a connection or a disconnection of the capacitor unit, which enables to contribute to a reliable operating protection element.

The invention will now be described in more detail by means of the annexed drawings which show some examples of a self-healing power capacitor according to the present invention.

Figure 1:
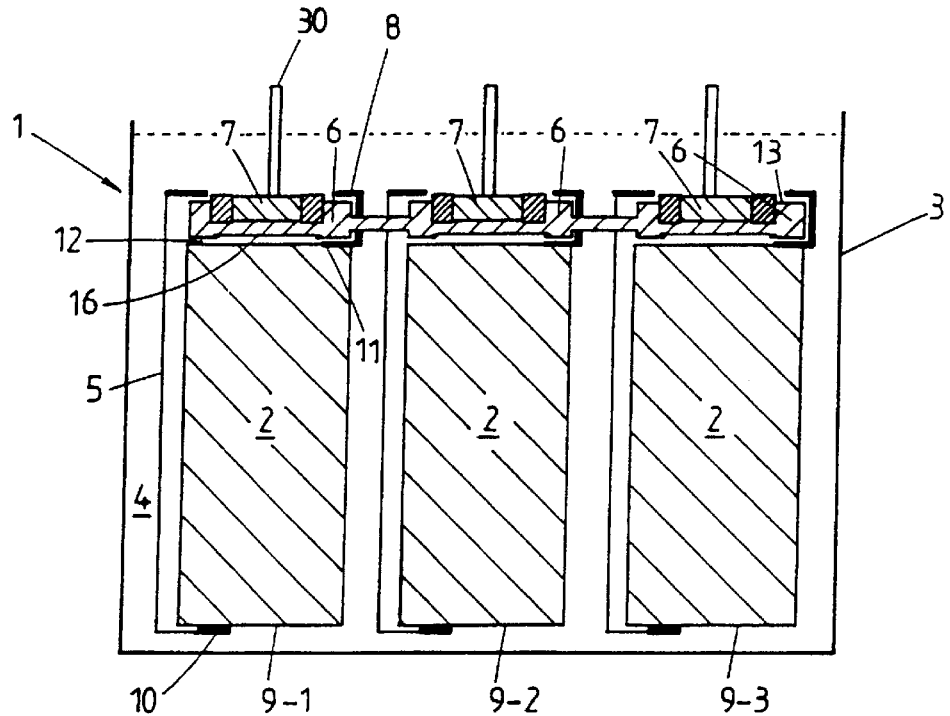
FIG. 1 and FIG. 3 show a cross-section through a first and a second preferred embodiment of a self-healing power capacitor according to the present invention.

In the drawings a same reference has been assigned to a same or analogous element.

FIG. 1 shows a first preferred embodiment of a self-healing power capacitor according to the present invention. In the illustrated example, the capacitor 1 comprises three capacitor units 9-1, 9-2 and 9-3. The three capacitor units are switched according to a delta or triangle configuration for a tri-phase current, where each side of the triangle comprises a capacitor unit. The number of capacitor units mounted in a same first casing 3 is however not restricted to three, and more or less capacitor units could be mounted in a same first casing, depending on the phases composing the current circuit in which the capacitor will be mounted.

Each capacitor unit comprises at least one winding 2, made of at least two films of insulating material on which a metal coating has been applied. It should be noticed that several windings could be wound co-axially, however for the present description this will be considered as one winding. The capacitor unit is for example manufactured by first evaporating a metallic deposit on a polypropylene film, which is thereafter wound into cylindrical or oval windings. The windings are metal sprayed on the end-faces to ascertain an electrical connection to an evaporated first 10 and second 11 electrode. The first 10 respectively second 11 electrode of each capacitor unit is connected to a first 5 respectively a second 8 conductor, to which an electrical power source is connectable. The windings 2 of each capacitor unit are surrounded by an encapsulation material 4, which fills up the space between the inner side of the first casing 3 and the windings 2. The encapsulation material is formed by resin, for example polyurethane.

A protection element 6 is mounted above the windings 2 of each capacitor unit. The location of the protection element above the windings is merely a practical choice and the protection element could also be located under the windings 2. The protection element must be mounted in such a manner, that a gas produced by a malfunction of the capacitor may move between the film layers and reach the protection element. The protection element 6 is separated from the upper end-face of the windings by a narrow gap 12 of for example 0.5–2 mm. The protection element is mounted in a second casing 13, which on its turn is also mounted inside the first casing 3. The conductors 5 and 8 are attached to the second casing 13. The second casing is also encapsulated by the encapsulation material 4. It should be noted that the encapsulation material, due to the high viscosity of the used resin, does practically not flow into the narrow gap between the windings and the second casing. Even if a little bit of resin should flow into the narrow gap, this does not affect the operation of the protection element, since the small dimension of the gap will take care that only a very little resin will penetrate the gap.

Figure 3:
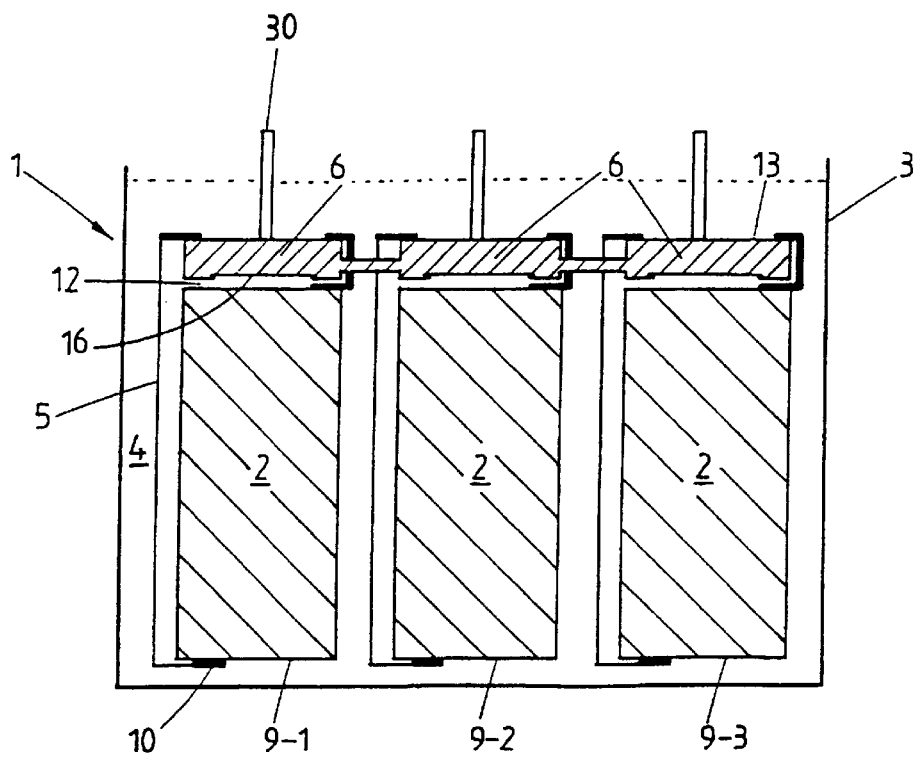

The second casing comprising the protection element, is mounted separated from the capacitor winding 2 and the top and/or bottom walls forming the first casing 3. The second casing is also preferably separated from the first casing. As the second casing is encapsulated by the encapsulating material, the protection element is also protected by the encapsulating material. The fact that the second casing is separated from the walls of the first casing, as is shown in FIGS. 1 and 3, signifies that damages to, or leakage of, the first casing would not influence or harm the protection element, since it is embedded in the resin. As can be seen in FIGS. 1 and 3, the first casing does not necessarily need to have a top wall as the windings and the second casing are both encapsulated. In such a manner the encapsulation material takes care of the protection of the capacitor and forms the cover of the power capacitor.

Figure 2:
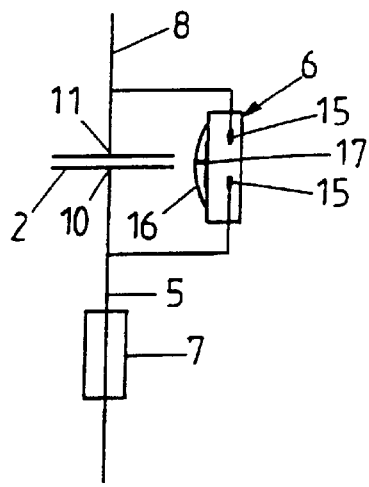
FIG. 2 and FIG. 4 illustrate schematically a capacitor unit, provided with its protection element, such as realised in the first and the second embodiment.

The operation of the protection element 6 will now be described in more detail by means of FIG. 2, which illustrates schematically a first embodiment of a capacitor unit according to the present invention. The protection element 6 is connected in parallel over the capacitor windings 2 and comprises a switch, having two contact members 15. A fuse 7 is connected in series with one of the electrodes of the capacitor unit and acts as a current interruption element, as will be described hereunder. The protection element 6 further comprises a membrane 16 with a contact plate 17. The contact plate 17, which is part of the switch, is provided to close the latter. The second casing is mounted in such a manner, that the membrane 16, which forms a side of the second casing, is in contact with the gap 12.

As already described in the preamble of the present application, the considered capacitor is a self-healing power capacitor. The protection element serves to disconnect the capacitor when a short-circuit or an electrical failure occurs, which can not be suppressed by the self-healing properties of the capacitor unit. When such an electrical failure occurs, a gas will be produced within the windings 2. The gas will travel along the windings and reach the narrow gap 12 between the end-face of the windings and the second casing 13. The gas will build up an overpressure within the narrow gap 12. As the membrane 16 faces the narrow gap, that overpressure is applied on the membrane. The pressure thus applied on the membrane, will cause the membrane 16 to move towards the contact members of the switch. When the applied pressure is sufficiently high, the contact plate 17 will reach the contact members 15 of the switch, causing the latter to close. The current applied on the electrode 8, will now flow via the switch to the fuse 7, causing the latter to melt by creating a high short-circuit current, directly between the winding electrodes. Once the fuse has melted, the capacitor unit is disconnected from the electrical source, as the link between the second electrode 11 and the power source is broken.

The membrane 16, is preferably a bi-stable membrane, which closes the switch from an initial open position into a closed position. The bi-stable membrane is more reliable, as the function of the membrane is to operate the contact plate 17 of the switch 15.

As the protection element 6 is mounted in the second casing 13, which is lodged in the encapsulation material, and as the second casing is separated from the windings 2 by the narrow gap 12, the protection element forms a separate component from the capacitor winding. It is therefore not influenced by the external environment, nor is the manufacturing of the winding influenced by the protection element. The latter being a separate component, which is separately testable during manufacturing of the capacitor. Through the location of the protection element, in the direct vicinity of the windings, the sensitivity of the element is enhanced and the response speed is improved.

Figure 4:
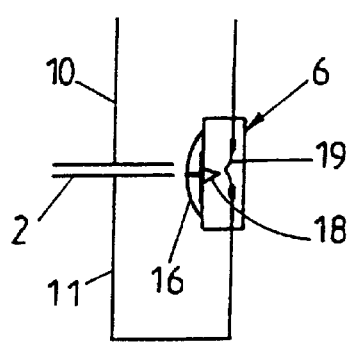

The FIGS. 3 and 4 show a second preferred embodiment of a self-healing power capacitor according to the present invention. The second embodiment differs from the first one, in the construction of the protection element 6. In the second embodiment, the current interruption element is integrated inside the second casing 13. The current interruption element is formed by a mechanically breakable conductor 19, which is connected in series with one of the electrodes of the capacitor unit. On the membrane 16 is mounted a cutting member 18. Preferably the cutting member 18 is formed by a glass piece, which has the advantage of being particularly suitable for cutting purposes and being a bad electrical conductor. The mechanically breakable conductor 19 is placed in front of the cutting member 18.

When a pressure is exerted on the membrane 16, the cutting member will be moved towards the fuse wire 19. Once the pressure has reached a predetermined value, the cutting member will have reached the fuse wire, and will cut the latter thus disconnecting the capacitor winding from the power source. The travel distance of the cutting member 13 as well as the one of the contact plate 17 in the first embodiment are adjusted in such a manner, that the disconnection of the capacitor unit will take place once the pressure on the membrane has reached a threshold value, indicative for an electrical failure inside the winding, which can not be self-healed by the capacitor.

Figure 5:
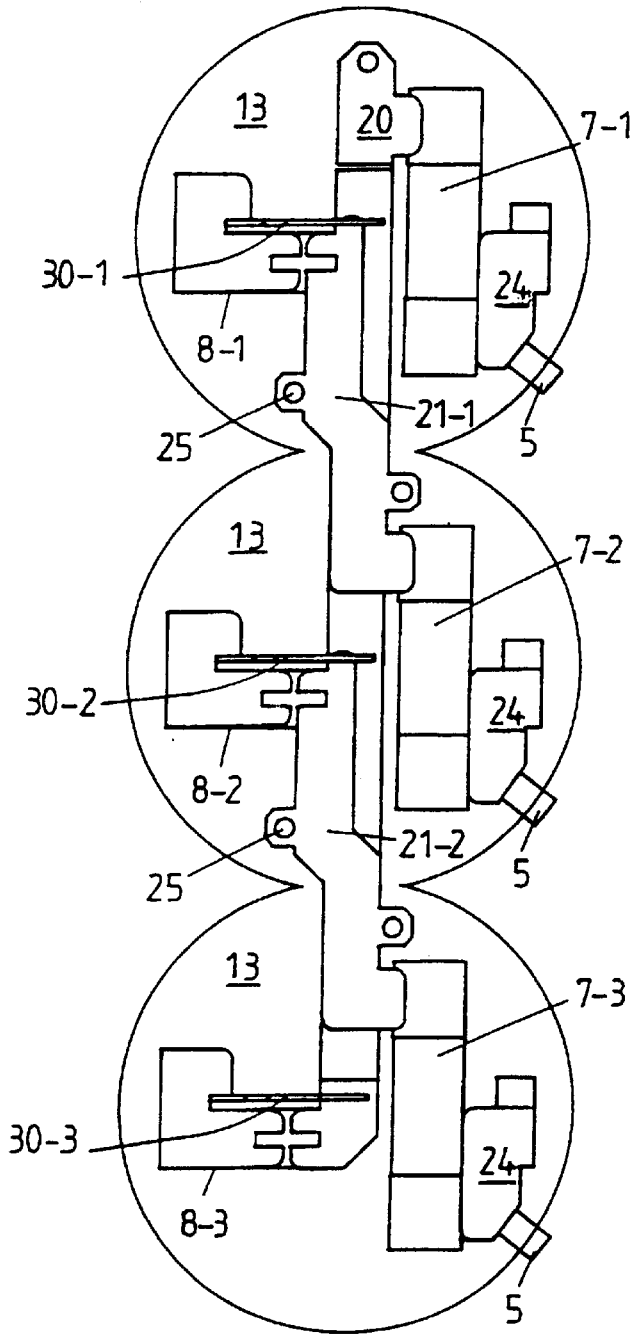
FIG. 5 shows a detailed view of the top side of a self-healing capacitor according to the first embodiment of the present invention.

FIG. 5 shows a top view of the first embodiment of a self-healing power capacitor according to the present invention, and in particular how the electrical contacts are built up. In FIG. 5 the encapsulation material is not visible in order to make the electrical contacts visible. In their final configuration these are embedded in the encapsulation material, so that only the terminals 30 are extending the encapsulation material. Two of the second conductors 8-1 and 8-2 are each time connected to a first plate 21-1, 21-2, which contacts one end of the fuse 7-2 respectively 7-3. The other end of fuse 7 being connected to a second plate 24, to which the first conductors 5 are each time connected. The second plates 24 are also each time connected to one of the switches 15. The other switch 15 being connected to third plates (not shown), which are each time connected to the first plates 21. A fourth plate 20, connected to fuse 7-1, is further connected to terminal 30-3 and second conductor 8-3. Perforations 25 are provided in order to position the second casing inside the first casing 3.

The first, second, third and fourth plates are all fixed on the second casing 13, wherein the protection element is housed. The second casing is preferably made of plastic material, which is a good electrical insulator and enables an easy manufacturing.

What is claimed is:

1. A self-healing power capacitor comprising at least one capacitor unit, each capacitor unit comprising at least one winding, made of at least two films of insulating material on which a metal coating has been applied, said at least one winding of each capacitor unit being provided with a first and a second connection electrode, said at least one winding being surrounded by an encapsulation material and housed in a first casing, said capacitor having at least one protection element for each capacitor winding, said protection element being mounted in a second casing, of which one side is formed by a membrane, said protection element being provided for activating, upon a pressure exerted on said membrane by a gas produced by a short-circuit within said at least one winding, a current interruption element connected in series with one of said electrodes, said protection element being separated from an end-face of said at least one winding, characterized in that said second casing is lodged inside said first casing, separated from the top or bottom walls belonging to said first casing, said second casing being lodged in said encapsulation material and having at least one wall separated by a narrow gap from said at least one winding.

2. A self healing power capacitor as claimed in claim 1, characterized in that said current interruption element comprises a fuse, and said protection element comprises a switch, provided to be switched by said membrane, said switch being connected in parallel with said first and second electrode.

3. A self healing power capacitor as claimed in claim 1, characterized in that said current interruption element comprises a fuse wire, connected in series with one of said electrodes and placed in front of a cutting member, which is part of said protection element, said cutting member being provided to be moved by said membrane towards said wire, in order to cut said wire, when said pressure is exerted on said membrane.

4. A self-healing power capacitor as claimed in claim 3, characterized in that said cutting member is formed by a glass piece.

5. A self healing power capacitor as claimed in claim 1, characterized in that said membrane is a bi-stable membrane.

6. A self healing power capacitor as claimed in claim 1, characterized in that, said protection element is made of a plastic material wherein a metallic conductor is housed.

7. A self healing power capacitor as claimed in claim 1, characterized in that at least three capacitors units are housed in said first casing.

8. A self-healing power capacitor as claimed in claim 1, characterized in that said second casing is lodged inside side first casing, separated from the top and bottom walls belonging to said first casing.

* * * * *